United States Patent Office 3,145,137
Patented Aug. 18, 1964

3,145,137
ALKANOYLAMIDOALKYLENEAMINES AND THEIR QUATERNARY AMMONIUM SALTS AS FUNGICIDES
Peter E. Newallis, Crestwood, and Ernest G. Jaworski, Olivette, Mo., assignors to Monsanto Company, St. Louis, Mo., a corporation of Delaware
No Drawing. Filed May 12, 1961, Ser. No. 109,500
9 Claims. (Cl. 167—22)

This invention relates to novel fungicides and is particularly directed to compositions and methods for the control of fungal organisms.

In accordance with this invention it has been found that upon application to fungal organisms and/or their horticultural habitats alkanoylamidoalkyleneamines or their quaternary ammonium salts or mixtures thereof effective control is obtained. The free amines and the quaternary ammonium salts thereof can be represented by the following formulae

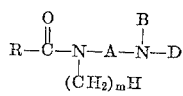

and

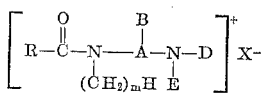

wherein R is a long chain acyclic hydrocarbon radical (e.g. heptyl, octyl, nonyl, decyl, undecyl, dodecyl, tridecyl, tetradecyl, pentadecyl, hexadecyl, heptadecyl, mixtures thereof, and the various isomeric forms thereof) containing 7 to 17 carbon atoms, wherein A is a divalent aliphatic hydrocarbon radical containing 1 to 3 carbon atoms, e.g.

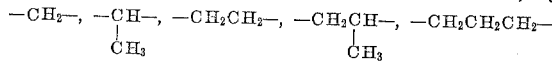

wherein $m$ is an integer from 0 to 2 inclusive, wherein B, D and E are like or unlike alkyl radicals containing 1 to 2 carbon atoms, and wherein X is halogen of atomic number in the range of 16 to 54 (e.g. iodine, chlorine or bromine).

The fungicidal agents of this invention are non-metallic which distinguishes them from a large number of other fungicidal materials and permits their usage on crops sensitive to metals, for instance on apples and other fruit sensitive to copper, zinc and arsenic compounds. The fungicidal agents of this invention also have a wide variety of activity for instance they display high fungicidal activity on foliage diseases of tomato.

As illustrative of the fungicidal agents of this invention but not limitative thereof are N-[2-(n-octanoylamido)ethyl]-N,N-dimethylamine
N-[(n-decanoylamido)methyl]-N,N-diethylamine
N-[2-(n-decanoylamido)ethyl]-N,N-dimethylamine
N-[2-(n-decanoylamido)ethyl]-N,N-diethylamine
N-[2-(N'-methyl-n-decanoylamido)ethyl]-N,N-diethylamine
N-[3-(n-decanoylamido)propyl]-N,N-diethylamine
N-[2-(n-undecanoylamido)ethyl]-N,N-diethylamine
N-[(lauroylamido)methyl]-N,N-diethylamine
N-[2-(lauroylamido)ethyl]-N,N-dimethylamine
N-[2-(lauroylamido)ethyl]-N,N-diethylamine
N-[2-(lauroylamido)ethyl]-N-methyl-N-ethylamine
N-[2-(lauroylamido)propyl]-N,N-diethylamine
N-[3-(lauroylamido)propyl]-N,N-diethylamine
N-[2-(N'-methyl-lauroylamido)ethyl]-N,N-diethylamine
N-[2-(N'-ethyl-lauroylamido)ethyl]-N,N-diethylamine
N-[2-(n-tridecoylamido)ethyl]-N,N-diethylamine
N-[2-(myristoylamido)ethyl]-N,N-dimethylamine
N-[2-(myristoylamido)ethyl]-N,N-diethylamine
N-[2-(stearoylamido)ethyl]-N,N-dimethylamine
N-[2-(stearoylamido)ethyl]-N,N-diethylamine
N-[(n-decanoylamido)methyl]-N,N,N-triethylammonium iodide
N-[2-(lauroylamido)ethyl]-N,N,N-triethylammonium iodide
N-[2-(lauroylamido)ethyl]-N,N,N-triethylammonium bromide
N-[2-(lauroylamido)ethyl]-N,N,N-triethylammonium chloride
N-[2-(myristoylamido)ethyl]-N,N,N-triethylammonium iodide
N-[2-(myristoylamido)ethyl]-N,N-diethyl-N-methylammonium iodide Of this novel class of fungicidal agents those of the formula

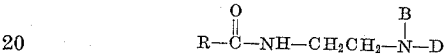

wherein B and D are like or unlike alkyl radicals containing 1 to 2 carbon atoms and wherein R is a long chain acyclic hydrocarbon radical containing 9 to 13 carbon atoms, particularly 11 carbon atoms, are effective and practical agents for the protection of fruit and foliage of fruit trees against such fungal organisms as Venturia inaequalis, the cause of apple scab.

The effectiveness of the fungicidal agents of this invention is set forth below in which they are applied to the habitat of the fungal organism.

Slide germination test.—By the slide germination test the concentration of the alkanoylamidoalkyleneamine required to inhibit complete germination of spores from 7- to 10-day old cultures of Venturia inaequalis is determined. 1.0 gram of the alkanoylamidoalkyleneamine (below itemized) is dissolved in acetone to make a concentrated solution thereof and thereto is added and intimately mixed 0.1 gram of sorbitan monolaurate polyoxyethylene derivative (a commercial water-soluble non-ionic emulsifying agent). Thereto is added and intimately mixed sufficient water to provide an aqueous emulsion containing 10 p.p.m. of the alkanoylamidoalkyleneamine. To a test tube is then added four volumes of the aqueous emulsion and one volume of spore stimulant and one volume of spore suspension, the spore stimulant being added to insure a high and relatively stable percentage of germination in the control. Drops of the test specimen mixture and an untreated control are pipetted onto glass slides. The glass slides are then placed in moist chambers for 20 hours' incubation at 22° C. Germination counts are made by counting 100 potentially viable spores, i.e. those spores which would germinate under the normal conditions of the control. The results were as follows:

| Compound | Germination |
| --- | --- |
| N-[2-(lauroylamido)ethyl]-N,N-diethylamine | None. |
| N-[2-(lauroylamido)ethyl]-N,N-dimethylamine | Do. |
| N-[2-(N'-methyl-lauroylamido)ethyl]N,N-diethylamine | Do. |
| N-[2-(lauroylamido)ethyl]-N,N,N-triethylammonium iodide | Very Slight. |
| N-[3-(lauroylamido)propyl]-N,N-diethylamine | Do. |
| N-[2-(n-decanoylamido)ethyl]-N,N-diethylamine | Do. |
| Control | Complete. |

To illustrate the activity of the fungicidal agents of this invention an apple disease foliage evaluation was conducted by measuring the ability to protect apple foliage against infection by the fungus, Venturia inaequalis. One year old growing vigorous apple seedlings were employed. Two of these plants were placed respectively on two small tables of a larger turntable mounted in a fume hood. The larger turntable rotated at 15 r.p.m. while the respective small tables rotated at 3.75 r.p.m. which arrangement insured all four sides of the plants to pass in front of the spray nozzle of the spray equipment in four revolutions of the larger turntable. In this time 10 ml. of an aqueous emulsion containing 3 p.p.m. of N-[2-(lauroylamido)ethyl]-N,N-diethylamine was sprayed over the seedlings at 15 pounds air pressure. After the spray deposit dried (24 hours) the treated seedlings and comparable untreated controls were sprayed at 15 pounds air pressure with about 10 ml. of a spore suspension containing approximately 1500 conidal spores of *Venturia inaequalis* per ml. The seedlings were then held at 100 percent relative humidity for 48 hours at 65° F. to permit spore germination and infection. After incubation the seedlings were placed in the greenhouse maintained at 70° F. Twenty-one days after the inoculation lesion counts were made in the five uppermost fully expanded leaves. The foliage treated with N-[2-(lauroylamido)ethyl]-N,N-diethylamine displayed no lesions while the foliage treated with the control displayed more than 50 lesions per leaf.

To further illustrate the activity of the fungicidal agents of this invention a tomato disease foliage evaluation was conducted by measuring the ability of the instant compounds to protect tomato foliage against infection by the late blight fungus, *Phytophthora infestans*. Four week old tomato plants of the variety Bonny Best were employed. Two of these plants were placed respectively on two small tables of a larger turntable mounted in a fume hood. The larger turntable rotated at 15 r.p.m. while the respective small tables rotated at 3.75 r.p.m. which arrangement insured all four sides of the plants to pass in front of the spray nozzle of the spray equipment in four revolutions of the larger turntable. In this time 10 ml. of an aqueous emulsion containing 10 p.p.m. of N-[2-(lauroylamido)ethyl]-N,N-diethylamine was sprayed over the plants at 15 pounds air pressure. After the spray deposit dried (24 hours) the treated plants and comparable untreated controls were sprayed with about 10 ml. of a spore suspension containing approximately 1500 germinated sporangia of *Phytophthora infestans* per ml. at 15 pounds air pressure. The plants were then held at 100 percent relative humidity for 48 hours at 65° F. to permit spore germination and infection. After incubation the plants were placed in the greenhouse maintained at 70° F. Seven days after the inoculation lesion counts were made in the two uppermost fully expanded leaves. The foliage treated with N[2-(lauroylamido)ethyl]-N,N-diethylamine displayed no lesions while the foliage treated with the control displayed more than 50 lesions per leaf.

To still further illustrate the activity of the fungicidal agents of this invention a tomato disease foliage evaluation was conducted by measuring the ability to protect tomato foliage against infection by the early blight fungus, *Alternaria solani*. Four week old tomato plants of the variety Bonny Best were employed. Two of these plants were placed respectively on two small tables of a larger turntable mounted in a fume hood. The larger turntable rotated at 15 r.p.m. while the respective small tables rotated at 3.75 r.p.m. which arrangement insured all four sides of the plants to pass in front of the spray nozzle of the spray equipment in four revolutions of the larger turntable. In this time 10 ml. of an aqueous emulsion containing 30 p.p.m. of N-[2-(lauroylamido)ethyl]-N,N-diethylamine was sprayed over the plants at 15 pounds air pressure. After the spray deposit dried (24 hours) the treated plants and comparable untreated controls were sprayed with about 10 ml. of a spore suspension containing approximately 1500 conidal spores of *Alternaria solani* per ml. at 15 pounds air pressure. The plants were then held at 100 percent relative humidity for 48 hours at 65° F. to permit spore germination and infection. After incubation the plants were placed in the greenhouse maintained at 70° F. Seven days after the inoculation lesion counts were made in the two uppermost fully expanded leaves. The foliage treated with N-[2-(lauroylamido)ethyl]-N,N - diethylamine displayed no lesions while the foliage treated with the control displayed more than 50 lesions per leaf.

N-[2-(lauroylamido)ethyl]-N,N-diethylamine can be prepared as follows: To a solution of 46.4 grams of N,N-diethyl ethylenediamine in 200 ml. of benzene is added at room temperature and while agitating a solution of 43.8 grams of lauroyl chloride in 100 ml. of benzene. The mass is then refluxed for 6 hours, cooled to room temperature, and then quenched with water. The organic layer is separated and washed first with aqueous sodium carbonate and then with water. The so-washed organic solution is then subjected to vacuum distillation to remove the volatiles. The solid residue is then recrystallized from pentane and dried to give a waxy white solid (M.P. 27° C.) which is N - [2 - (lauroylamido)ethyl]-N,N-diethylamine.

N - [2 - (lauroylamido)ethyl] - N,N,N-triethylammonium iodide can be prepared as follows: To 8.95 grams of N-[2-(lauroylamido)ethyl]-N,N-diethylamine in 60 ml. of benzene is added 5.45 grams of ethyl iodide and mix heated with agitation at 65–70° C. for four hours. The mass is then subjected to vacuum distillation to remove the volatiles. The solid residue is then recrystallized from ethyl acetate and dried to give a waxy white solid (M.P. 59–60° C.) which is N-[2-(lauroylamido)-ethyl]-N,N,N-triethylammonium iodide.

Although the novel fungicidal agents of this invention are useful per se in controlling a wide variety of fungal organisms, it is preferable that they be supplied to the organisms or to the environment of the organisms in a dispersed form in a suitable extending agent.

In the instant specification and appended claims it is to be understood that the term "dispersed" is used in its widest possible sense. When it is said that the fungicidal agents of this invention are dispersed, it means that the particles of the fungicidal agents of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the fungicidal agents of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the fungicidal agents of this invention employed in combatting or controlling fungal organisms can vary considerably provided the required dosage (i.e., toxic or lethal amount) thereof is supplied to the organisms or to the environment of the organisms. When the extending agent is a liquid or mixture of liquids (e.g. as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organisms or to the environment of the organisms as aerosols, it is convenient to dissolve them in a suitable solvent and disperse the resulting solution in dichlorodifluoromethane or like chlorofluoroalkane which boils below room temperature at atmospheric pressure.

The fungicidal agents of this invention are preferably supplied to the fungal organisms or to the environment of the organisms in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York), in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition, page 280). These surfactants include the well-known capillary-active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York), and also in the November 1947 issue of Chemical Industries (pages 811–824) in an article entitled "Synthetic Detergents" by John W. McCutcheon, and also in the July, August, September and October 1952 issues of Soap and Sanitary Chemicals under the title "Synthetic Detergents." The disclosures of these articles with respect to surfactants, i.e. the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The fungicidal agents of this invention can be dispersed by suitable methods (e.g., tumbling or grinding in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materals, and include, for example, such materials of organic nature as powdered cork, powdered wood, and powdered walnut shells. The preferred solid carriers are the adsorbent clays, e.g. bentonite. These mixtures can be used for fungicidal purposes in the dry form, or, by addition of water soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g. sodium stearate or oleate or palmitate or mixtures thereof) with or without the aid of solubility promoters and/or surfactants or dispersing agents.

In all of the forms described above the dispersions can be provided ready for use in combatting fungal organisms or they can be provided in a concentrated form suitable for mixing with or dispersing in other extending agents. As illustrative of a particularly useful concentrate is an intimate mixture of one or more fungicidal agents of this invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray for combatting various forms of fungal organisms by the addition of water thereto. As illustrative of such a concentrate is an intimate mixture of 95 parts by weight of N-[2-(lauroylamido)ethyl]-N,N-diethylamine and 5 parts by weight of a water-soluble non-ionic surfactant such as the polyoxyethylene derivative of sorbitan monolaurate.

Another useful concentrate adapted to be made into a spray for combatting fungal organisms is a solution (preferably as concentrated as possible) of one or more fungicidal agents of this invention in an organic solvent therefor. The said liquid concentrate preferably contains dissolved therein a minor amount of (e.g., 0.5 to 10 percent by weight of the weight of the new fungicidal agent) of a surfactant (or emulsifying agent), which surfactant is also water-soluble. As illustrative of such a concentrate is a solution of N-[2-(lauroylamido)ethyl]-N,N-diethylamine in acetone which solution contains dissolved therein a water-soluble polyoxyethylene glycol non-ionic surfactant and a water-soluble alkylaryl sulfonate anionic surfactant.

Of the surfactant aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethyl derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bacterocides, and herbicides. In this manner it is possible to obtain mixtures which are effective against a wide variety of pests and other forms of noxious life.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g. agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g. power dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

What is claim is:

1. The method which comprises applying to fungal organisms in their horticultural habitats at least one compound selected from the group consisting of

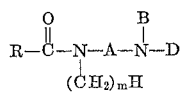

and

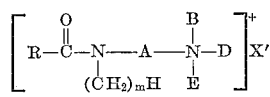

where in the foregoing formulae R is long chain saturated acyclic hydrocarbon containing 7 to 17 carbon atoms, wherein $m$ is an integer from 0 to 2, inclusive, wherein A is divalent aliphatic hydrocarbon containing 1 to 3 carbon atoms, wherein B, D and E respectively are alkyl containing 1 to 2 carbon atoms, and wherein X is halogen of atomic number in the range of 16 to 54.

2. The method which comprises applying to fungal organisms in their horticultural habitats at least one compound of the formula

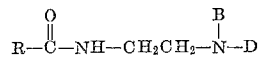

wherein R is long chain saturated acyclic hydrocarbon containing 9 to 13 carbon atoms, and wherein B and D are alkyl containing 1 to 2 carbon atoms.

3. The method which comprises applying to fungal organisms in their horticultural habitats at least one compound of the formula

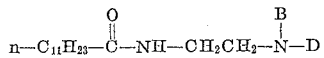

wherein B and D are alkyl containing 1 to 2 carbon atoms.

4. The method of claim 3 wherein the lauroylamidoethyleneamine is N-[2-(lauroylamido)ethyl]-N,N-diethylamine.

5. The method of claim 3 wherein the lauroylamidoethyleneamine is N-[2-(lauroylamido)ethyl]-N,N-dimethylamine.

6. The method of combatting fungal organisms which attack fruit trees which comprises applying to the fruit trees at least one compound of the formula

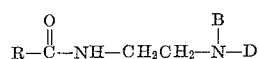

wherein R is long chain saturated acyclic hydrocarbon containing 9 to 13 carbon atoms and wherein B and D are alkyl containing 1 to 2 carbon atoms.

7. The method of combatting Venturia inaequalis which comprises applying to apple trees N-[2-(lauroylamido) ethyl]-N,N-diethylamine.

8. A fungicidal concentrate comprising at least one alkanoylamidoethyleneamine of the formula

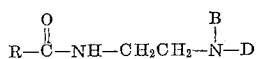

wherein R is long chain saturated acyclic hydrocarbon containing 9 to 13 carbon atoms and wherein B and D are alkyl containing 1 to 2 carbon atoms, dispersed in an organic solvent therefor and having dissolved therein a minor amount of a water-soluble surfactant, said concentrate forming an emulsion with water upon agitation therewith.

9. A fungicidal concentrate adapted to be made into a sprayable composition by the addition of water comprising at least one alkanoylamidoethyleneamine of the formula

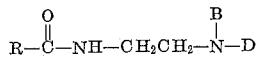

wherein R is long chain saturated acyclic hydrocarbon containing 9 to 13 carbon atoms and wherein B and D are alkyl containing 1 to 2 carbon atoms, in admixture with a water-soluble surfactant in the weight proportions of 0.1 to 15 parts surfactant and sufficient alkanoylamidoethyleneamine to make 100 parts by weight.

References Cited in the file of this patent

UNITED STATES PATENTS 2,459,062    Cook et al. _____ Jan. 11, 1949